United States Patent Office 3,287,227
Patented Nov. 22, 1966

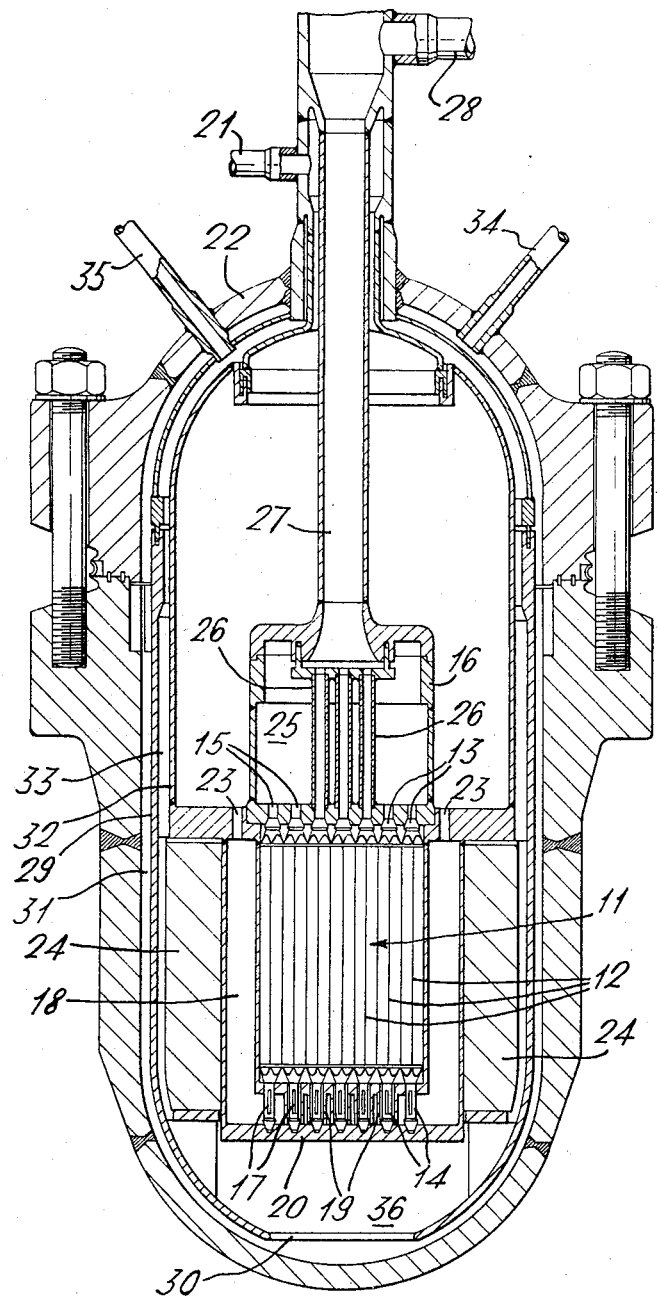

3,287,227
NUCLEAR REACTORS
Ronald Tunstall Ackroyd, Upton-by-Chester, Maurice Arthur Perks, Warrington, John Erskine Mann, Liverpool, and Allan Barker, Chester, England, assignors to United Kingdom Atomic Energy Authority, London, England
Filed June 11, 1965, Ser. No. 463,282
Claims priority, application Great Britain, June 19, 1964, 25,457/64
7 Claims. (Cl. 176—40)

The present invention relates to heterogeneous fast nuclear reactors. A fast reactor has a core including a fast fuel region by which is implied the absence of any large amount of moderator and therefore the ability to sustain a fission chain reaction with a high energy neutron flux; it is to be understood herein that in the fast fuel region this reaction is sustained with a neutron flux energy spectrum having an average in excess of 1 kev.

The invention concerns in particular a fast reactor which is cooled by a supercritically pressurized aqueous coolant. Such terminology for the coolant is preferred for the reason that at supercritical pressures (above 3206 p.s.i.a.) there is no distinct phase change from water to steam as the temperature is increased above the critical temperature (374° C.) and consequently there is uncertainty whether to call the fluid water or steam.

The moderating property of an aqueous coolant introduced into a fast reactor degrades or softens the neutron energy spectrum. The softer spectrum increases non-productive capture of neutrons relative to fission in the fuel and decreases both the amount of fission in fertile isotopes, such as $U^{238}$, and the average number of neutrons generated per fission. In the event of the coolant density becoming less than corresponds to normal operation by virtue of the temperature increase, the spectrum becomes harder and the aforementioned factors become correspondingly less effective with a consequent gain in neutron population. This gain in population counteracts the increasing leakage of neutrons from the core which occurs as the coolant density is reduced. Thus not only is there a lesser margin of reactivity reduction on coolant loss in a small core where leakage is dominant, but in larger cores where leakage plays a smaller part there may even be a reactivity gain. Although the occurrence of loss of coolant in practice may be considered most unlikely, it is customary for reactors to be so designed as to be safe in these circumstances, or, in other words, they should possess a negative void coefficient.

It has been proposed elsewhere that a nuclear reactor core cooled by a supercritically pressurized aqueous coolant can be made safe on loss of coolant by such measures as including a proportion of heavy water in the coolant or introducing a composite zone of solid moderator and fertile material in the fast fuel region. These proposals are cited to illustrate that designers are finding themselves compelled to have recourse to elaborate features in order to be sure of an acceptable margin of reactivity reduction on loss of coolant. Whether, and to what extent, such elaboration is necessary depends on how far short of the desired margin the reactivity on loss of coolant would otherwise fall. It is one of the objects of the invention to provide a simple expedient to avoid unnecessarily adding to this reactivity.

The reader must also first know that the reactivity characteristic as a function of coolant density of a fast reactor cooled by supercritically pressurized aqueous coolant also shows for a certain range of core coolant fractions a tendency for the core to become supercritical at the maximum coolant density of 1 gm./cc., this condition being known commonly as "flooding" of the core. To counteract divergence on flooding, the known expedient is conveniently adopted of including in the core an epithermal neutron absorber, that is to say, an absorber which has a large capture cross section for neutrons having energies in the epithermal range. Such an absorber becomes increasingly effective in capturing neutrons as the neutron energy spectrum is softened and is chosen to achieve peak effectiveness in advance of the 0.3 ev. fission resonance of $Pu^{239}$ which is a strong contributor to the reactivity rise on flooding. Absorbers in this category are hafnium, indium and europium, and the manner of introduction into the core which is generally considered most effective is a uniform dispersion in the fuel material of the fuel elements.

According to the present invention, in a fast nuclear reactor having a core which is cooled by a supercritically pressurized aqueous coolant and which has epithermal neutron absorber for counteracting reactivity gain on flooding, the core is so adapted that the epithermal absorber is concentrated in a part of the core where in normal operation the coolant density is less than elsewhere in the core. Preferably the epithermal absorber is concentrated exclusively in this part of the core. In the core part in question the increase of density on flooding is greater than the average over the core as a whole and the effect of the absorber is therefore more sharp on flooding. Conversely, the decrease of density on loss of coolant is less and therefore the gain of reactivity in this circumstance is less than if the absorber were distributed uniformly overall.

It is preferred that the low density part of the core constitutes the core center, an arrangement which is conveniently achieved by multi-pass coolant flow. Thus in one embodiment of the invention, a fast nuclear reactor comprises a core adapted to be cooled by an aqueous coolant, feed means to supply the coolant to the core at a supercritical pressure, flow guides to cause the coolant supplied by the feed means to pass serially in separate passes through different parts of the core, the first pass being through an outer part of the core, and epithermal neutron absorber for counteracting reactivity gain on flooding which absorber is included in the core elsewhere than in the outer part. In the other parts of the core the neutron flux density may be higher and the effect of the absorber therein is therefore further enhanced. Whilst this last-mentioned point is generally true because of the increasing leakage of neutrons towards the core periphery, the multi-pass arrangement as previously set forth may use a sequence of passes in which the first in the outer part is sufficiently dense, by virtue of a relatively low inlet temperature, for radial leakage in normal operation to be considerably suppressed and therefore for the flux distribution to be substantially flattened.

By way of illustration of the invention, a particular embodiment will now be described, this embodiment being taken by way of example only and being shown in longitudinal section in the accompanying drawing.

This illustrated embodiment is a 42 MW(T) fast reactor in which the core is cooled by supercritically pressurised aqueous coolant making three passes respectively through outer, intermediate and central regions of the core, the design as seen in the drawing being based on the following specifications:

*Basic dimensions*

| | Inches |
|---|---|
| Diameter of core | 26.2 |
| Distance across flats of hexagonal fuel assembly | 4.14 |
| Assembly pitch | 4.14 |
| Fuel thickness | 0.1 |
| Fuel plate thickness | 0.12 |
| Fuel sheath thickness | 0.01 |
| Fuel plate pitch | 0.14 |
| Length of fuel | 18.7 |

Fuel

| | |
|---|---|
| Volume of fuel | $5.64 \times 10^3$ in. |
| Weight of fuel | $8.22 \times 10^5$ gm. |
| Density of fuel | 8.94 gm./cc. |

Fuel assemblies

| | |
|---|---|
| Total No. of fuel assemblies | 37 |
| No. of fuel plates/assembly | 26 |
| No. of assemblies in 1st pass | 18 |
| No. of assemblies in 2nd pass | 12 |
| No. of assemblies in 3rd pass | 7 |

Core volume fractions

| | |
|---|---|
| 18/8/1 S.S. (cladding and assembly wrapper) | 0.34 |
| Coolant | 0.11 |
| Cermet (60% S.S., 40% oxide) | 0.55 |

Top axial reflector (24 in.) volume fractions

| | |
|---|---|
| Steel | 0.226 |
| Coolant at mean density of 14.15 lb./ft.$^3$ (0.227 gm./cc.) | 0.774 |

Bottom axial reflector volume fractions

Higher (3 in.):

| | |
|---|---|
| Steel | 0.50 |
| Coolant at 28.7 lb./ft.$^3$ (0.46 gm./cc.) | 0.50 |

Lower (12 in.):

| | |
|---|---|
| Steel | 0.25 |
| Coolant | 0.75 |

Radial reflector volume fractions

Inner (5.9 in.): Coolant at 50.5 lb./ft.$^3$ (0.808 gm./cc.).
Outer (10 in.): Steel.

Fuel ratings

| | Watt/gm. |
|---|---|
| Average rating of 1st pass | 51.6 |
| Average rating of 2nd pass | 50 |
| Average rating of 3rd pass | 45.2 |
| Peak rating | 70.6 |

Coolant conditions

| | |
|---|---|
| Mass flow, lb./hr. | $1.4 \times 10^5$ |

| | 1st Pass | 2nd Pass | 3rd Pass |
|---|---|---|---|
| Inlet Temp. (°C.) | 259 | 384 | 460 |
| Outlet Temp. (°C.) | 384 | 460 | 565 |
| Mean Temp. (°C.) | 645 | 407 | 510 |
| Inlet Density (lb./ft.$^3$) | 50.5 | 14.2 | 6.2 |
| Outlet Density (lb./ft.$^3$) | 14.2 | 6.2 | 4.5 |
| Mean Density (lb./ft.$^3$) | 33.7 | 10.1 | 5.37 |

The fuel as specified above is contained in fuel assemblies which are closely packed in upright parallel relationship to form the core designated generally 11 in the drawing. Each assembly comprises an open-ended hexagonal casing 12 in which the fuel is supported in the form of a pack of parallel-spaced sheathed fuel plates. The fuel material in these plates is a cermet of the mixed dioxides of uranium and plutonium dispersed in a matrix of stainless steel, the proportions by volume being 40% mixed oxides and 60% stainless steel and the mixed oxides representing an enrichment (i.e. ratio of plutonium to plutonium plus uranium atoms) of 70%.

To provide the top and bottom axial reflectors, as well as the interconnection of the core passes, the casings 12 of the fuel assemblies are extended both at top and bottom by hollow cylindrical spikes 13 and 14 having an outer diameter less than the distance across the flats of the casing hexagon; a suitable diameter is 2 inches. The top spikes 13 are short and are seated in apertures 15 of a removable block 16. The bottom spikes 14 are longer so as to provide laterally opening slots 17. In respect of the outermost row of assemblies, the slots 17 are open to the radial reflector space 18 encircling the core with uniform width; in respect of the other assemblies, the slots 17 are in tubes 19 of the core support structure 20.

At this stage the reader will see that inlet coolant admitted through a coolant inlet nozzle 21 at the top of a reactor pressure vessel 22 housing the core 11 finds its way through a ring of perforations 23 and the radial reflector space 18 to the slots 17 in the bottom spikes 14 of the outermost row of fuel assemblies. In passing it should be noted that the radial reflector is formed by the inlet coolant in the space 18 together with a surrounding annulus of steel 24. The coolant flows up the assemblies of the outermost row, thereby to execute the first pass, and is then received in a cavity 25 of the removable block 16. The apertures 15 in respect of the two outer rows of assemblies are interconnected by this cavity 25, the remainder of the apertures 15 being isolated from the cavity by tubes 26 connecting them directly to an outlet duct 27. Therefore, the first pass is followed by a second downward pass through the next row of assemblies. The tubes 19 of the core support structure 20 intercommunicate at their upper ends and therefore the second coolant pass is followed by a third upward pass through the group of assemblies composed of the central assembly and the row immediately surrounding it. On completion of the third pass, the coolant is carried through the tubes 26 and the outlet duct 27 to a coolant outlet nozzle 28 at the top of the reactor vessel 22.

Such further features in the drawing as are relevant will now be dealt with briefly: A liner 29 with a bottom opening 20 is separated by a gap 31 from the inside surface of the reactor vessel 22; with a thin-walled inner vessel 32 by which the core support structure 20 is carried this liner 29 forms another gap 33. From an appropriate point in the coolant circuit externally of the vessel 22 coolant is supplied to an inlet nozzle 34 at supercritical pressure and such low temperature that the mean density in passing from this inlet nozzle to an outlet nozle 35 is 60 lbs./ft.$^3$. The path between these nozzles is through the gaps 31 and 33 and the bottom reflector space 36.

The comparatively thick coolant reflector layers bounding the core on all sides provide for such a large measure of leakage control that at zero coolant density, i.e., complete loss of coolant, there is a considerable loss of reactivity.

To ensure loss of reactivity on flooding, europium oxide is added to the fuel as a uniform dispersion in the cermet fuel material, but in accordance with the invention this addition is limited to the fuel in the assemblies of the second and third passes, the amount added being equivalent to 3% by volume of these two passes of the core. It is estimated that in this way the reactivity reduction on flooding is 1.7%. Although the addition results in a lowering of the margin of reduction on complete loss of coolant, the margin retained is nevertheless estimated to be 4.9% and is much better than it would have been had the epithermal absorber been distributed uniformly in all the passes.

What we claim is:

1. A fast nuclear reactor having a core which is cooled by supercritically pressurised aqueous coolant and which has epithermal neutron absorber for counteracting reactivity gain on flooding, characterised in that the epithermal absorber is concentrated in a part of the core where in normal operation the coolant density is less than elsewhere in the core.

2. A fast nuclear reactor as claimed in claim 1, in which the epithermal absorber is concentrated exclusively in the aforesaid part of the core.

3. A fast nuclear reactor comprising a core adapted to be cooled by an aqueous coolant, feed means to supply the coolant to the core at a supercritical presure, flow guides to cause the coolant supplied by the feed means to pass serially in separate passes through different parts of the core, the first pass being through an outer part of the core, and epithermal neutron absorber for counteracting reactivity gain on flooding which absorber is included in the core elsewhere than in the outer part.

4. A fast nuclear reactor as claimed in claim 3, in which the flow guides are arranged to cause the coolant to make three passes respectively through outer, intermediate and central parts of the core, the epithermal absorber being confined to the intermediate and central parts.

5. A fast nuclear reactor comprising a core adapted to be cooled by an aqueous coolant, feed means to supply the coolant to the core at a supercritical pressure, flow guides to cause the coolant supplied by the feed means to pass serially in separate passes through different parts of the core, the first pass being through an outer part of the core, and epithermal neutron absorber for counteracting reactivity gain on floding which absorber is included as a uniform dispersion in fuel material disposed in the core elsewhere than in the outer part.

6. A fast nuclear reactor as claimed in claim 5, in which the epithermal absorber is europium.

7. A fast nuclear reactor as claimed in claim 6, in which the europium is in the form europium oxide dispersed uniformly with mixed dioxides of uranium and plutonium in a matrix of non-fissile metal.

References Cited by the Examiner
UNITED STATES PATENTS 3,205,139   9/1965   Stewart et al. _____ 176—93 X REUBEN EPSTEIN, *Primary Examiner.*